United States Patent
Blalock et al.

[11] Patent Number: 5,465,121
[45] Date of Patent: Nov. 7, 1995

[54] METHOD AND SYSTEM FOR COMPENSATING FOR IMAGE DISTORTION CAUSED BY OFF-AXIS IMAGE PROJECTION

[75] Inventors: James L. Blalock, deceased, late of Aubry, by Karen Blalock, independent administratrix; William R. Sterrett, Farmers Branch, both of Tex.

[73] Assignee: International Business Machines Corporation, Armonk, N.Y.

[21] Appl. No.: 40,737

[22] Filed: Mar. 31, 1993

[51] Int. Cl.⁶ .................................................. H04N 5/74
[52] U.S. Cl. ........................ 348/744; 348/745; 348/181; 348/184
[58] Field of Search ..................... 348/744, 745, 348/746, 747, 807, 806, 181, 184, 189; H04N 5/74

[56] References Cited

U.S. PATENT DOCUMENTS

| | | | |
|---|---|---|---|
| 4,490,652 | 12/1984 | Beck | 315/366 |
| 5,200,815 | 4/1993 | Tsujihara et al. | 348/745 |
| 5,231,481 | 7/1993 | Eouzan et al. | 348/745 |
| 5,298,985 | 3/1994 | Tsujihara et al. | 348/807 |

OTHER PUBLICATIONS

IBM Technical Disc. Bulletin Nov. 1970, L. E. Ambrico "CRT Distortion Correction Circuit".

*Primary Examiner*—James J. Groody
*Assistant Examiner*—Nina N. West
*Attorney, Agent, or Firm*—Norman L. Gundel; L. Bruce Terry; Andrew J. Dillon

[57] ABSTRACT

A method and system in a data processing system for modifying an image source data file to compensate for distortions resulting from a projection of an image source onto a surface that is not perpendicular to an image source projection system. A data processing system image source data file is identified and a test pattern is displayed utilizing a data processing system visual output device. A user is permitted to enter a distortion compensation factor, the displayed test pattern is modified utilizing the distortion compensation factor. Once a final distortion compensation factor is selected in response to the appearance of the modified test pattern, the data processing system image source data file is modified, utilizing the selected distortion compensation factor, thereby enhancing the projection of an image source onto a surface that is not perpendicular to an image source projection system.

15 Claims, 6 Drawing Sheets

METHOD AND SYSTEM FOR COMPENSATING FOR IMAGE DISTORTION CAUSED BY OFF-AXIS IMAGE PROJECTION

BACKGROUND OF THE INVENTION

1. Technical Field

The present invention relates in general to an improved data processing system and in particular to a method and system for enhanced projection of data processing system generated text, graphics or multimedia presentations. Still more particularly, the present invention relates to a method and system for precompensating data processing system generated text, graphics or multimedia presentations to compensate for distortion resulting from off-axis projection.

2. Description of the Related Art

As the availability of desktop publishing and graphic presentation software increases, and as such software becomes easier to utilize, the public is beginning to expect a higher standard of quality in the communication of information through the text, graphics and multimedia presentations produced utilizing such software. Presentations that were once typed and photocopied onto an overhead transparencies are now carefully prepared utilizing sophisticated software programs and printed on laser printers or on photographic slide film. More complex presentations, which may incorporate animated fades and dissolves between images, or even full motion video, may utilize a data processing system to drive a liquid crystal display (LCD) projection panel utilized with an overhead projector, or a three-gun cathode-ray tube (CRT) video projection system, or an LCD projection unit, each of which has the capability to produce full motion color images.

Even though many hours of time and much effort is utilized to produce such high quality presentations, many times the presentation is distorted when the images are projected on a projection surface, such as a wall or vertical screen. Such image distortion is often introduced by the relative placement of the projection system with respect to an axis normal to the projection surface at the center of the projected image. If an imaginary line drawn from the projection lens to the center of the projected image is not perpendicular (normal) to the surface on which the image is being projected, the image will appear distorted. Such image projection which is not normal to projection surface at the center of the projected image may be referred to as "off-axis projection." Consider, for example, the case in which a projection system is placed on a table and the image is projected onto a portion of a wall that is located above the level of the projection device. The image resulting from such projection will be wider at the top of the image than at the bottom of the image; a form of rectilinear distortion which may be referred to as a "keystone" distortion.

In a typical projection system, an image source S, which may be slide film, an overhead transparency or an LCD panel, is located between a condensing lens system and an objective. The condensing lens system captures divergent light rays from a concentrated source of light, and the objective lens, or lens system, forms an enlarged, inverted image of S upon a distant projection surface, such as a wall or screen. The ratio of enlargement, or magnifying power, M, of a projection system depends upon the distance D from the source S to the projection surface and the focal length f of the objective: $M=(D-f)/f$. Therefore the magnifying power is directly proportional to the distance D from the image source S to the projection surface; that is, the further the image is projected before being reflected from the projection surface, the larger the image will appear.

Thus, the image is larger near the top of the projected image and smaller near the bottom of the projected image because, in the case where the image is projected above the level of the projection system onto a vertical wall, the distance from the image source to the projection surface at the top of the image is longer, which produces a greater magnification near the top part of the image, than the distance from the image source to the projection surface at the bottom of the image, which produces a lesser magnification near the bottom of the image.

It should therefore be apparent that a need exist for a method and system which compensates for distortion, which results from off-axis projection of an image source, and thereby produces a more distortion free projected image.

SUMMARY OF THE INVENTION

It is therefore one object of the present invention to provide an improved data processing system.

It is another object of the present invention to provide a method and system for enhanced projection of data processing system generated text, graphics or multimedia presentations.

It is yet another object of the present invention to provide a method and system for precompensating data processing system generated text, graphics or multimedia presentation image file to compensate for distortion resulting from off-axis projection of an image source.

The foregoing objects are achieved as is now described. A method and system are disclosed in a data processing system for modifying an image source data file to compensate for distortions resulting from a projection of an image source onto a surface that is not perpendicular to an image source projection system. A data processing system image source data file is identified and a test pattern is displayed utilizing a data processing system visual output device. A user is permitted to enter a distortion compensation factor, the displayed test pattern is modified utilizing the distortion compensation factor. Once a final distortion compensation factor is selected in response to the appearance of the modified test pattern, the data processing system image source data file is modified, utilizing the selected distortion compensation factor, thereby enhancing the projection of an image source onto a surface that is not perpendicular to an image source projection system.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
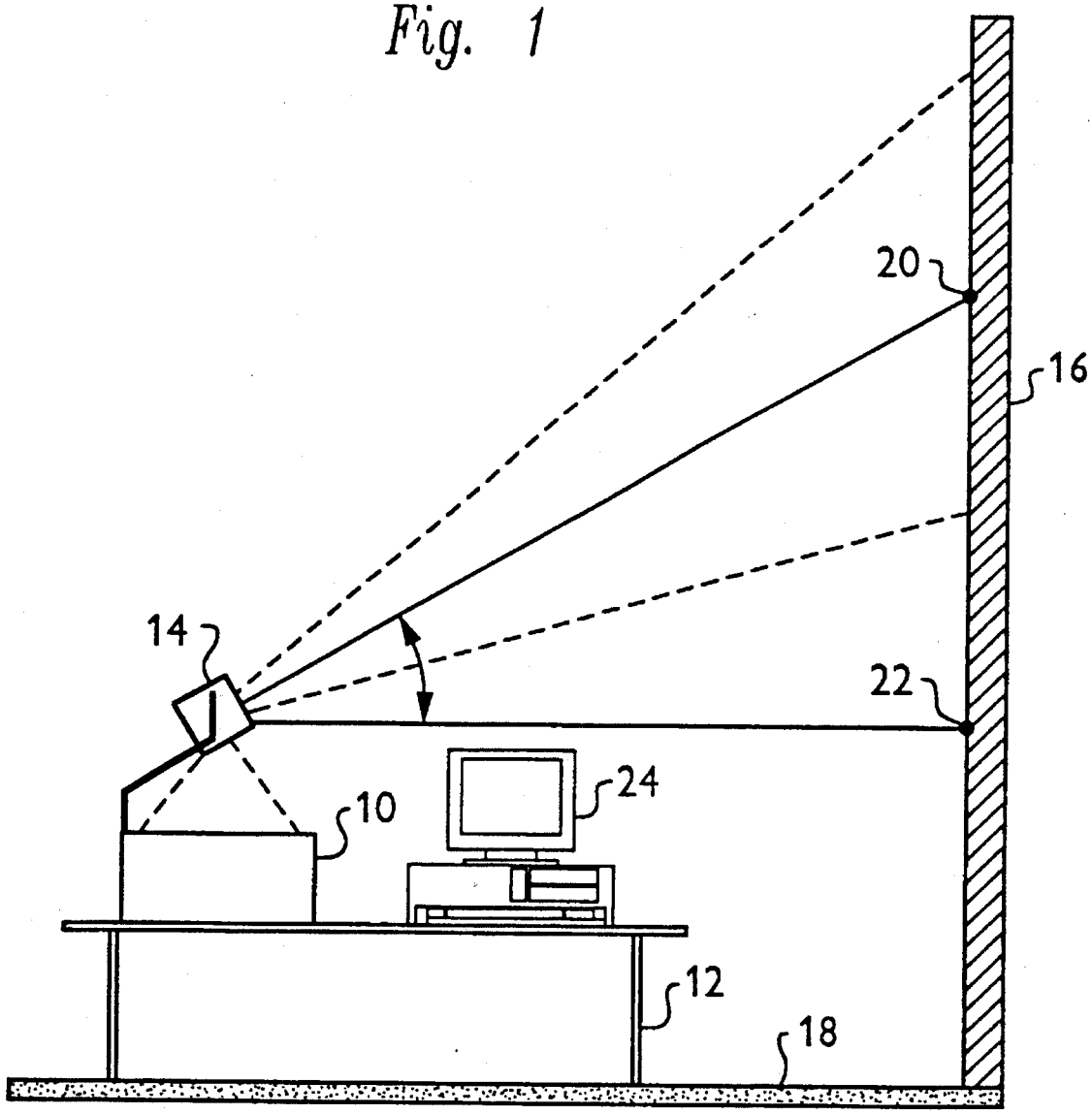
FIG. 1 is a side view of a data processing system and a projection system which may be utilized to implement the method and system of the present invention.

With reference now to the figures and in particular with reference to FIG. 1, there is depicted a side view of a projection system 10, which is supported by table 12. Projection system 10 preferably includes an objective lens system 14 which is utilized to project a source image onto wall 16.

As illustrated, objective lens system 14 is typically tilted upward, so that the image that appears upon wall 16 is higher above floor 18 than the height of objective lens system 14. Such a tilt of objective lens system 14 results in an off-axis projection of the image onto wall 16, which causes a distortion of the projected source image. The angle of tilt of objective lens system 14 can be shown by the angle between a line drawn from objective lens system 14 to point 20 located at the center of the projected image on wall 16, and a line drawn perpendicular to wall 16 from objective lens system 14 to point 22 located on wall 16.

Data processing system 24 is preferably utilized to generate the source image which is projected by projection system 10. Data processing system 24 may also be utilized to drive a liquid crystal display (LCD) projection panel, which may, when utilized in conjunction with an overhead projector, be considered part of projection system 10. Those persons skilled in the art should appreciate that projection system 10 may also include a three-gun cathode-ray tube (CRT) video projection system, or an LCD projection unit.

Figure 2:
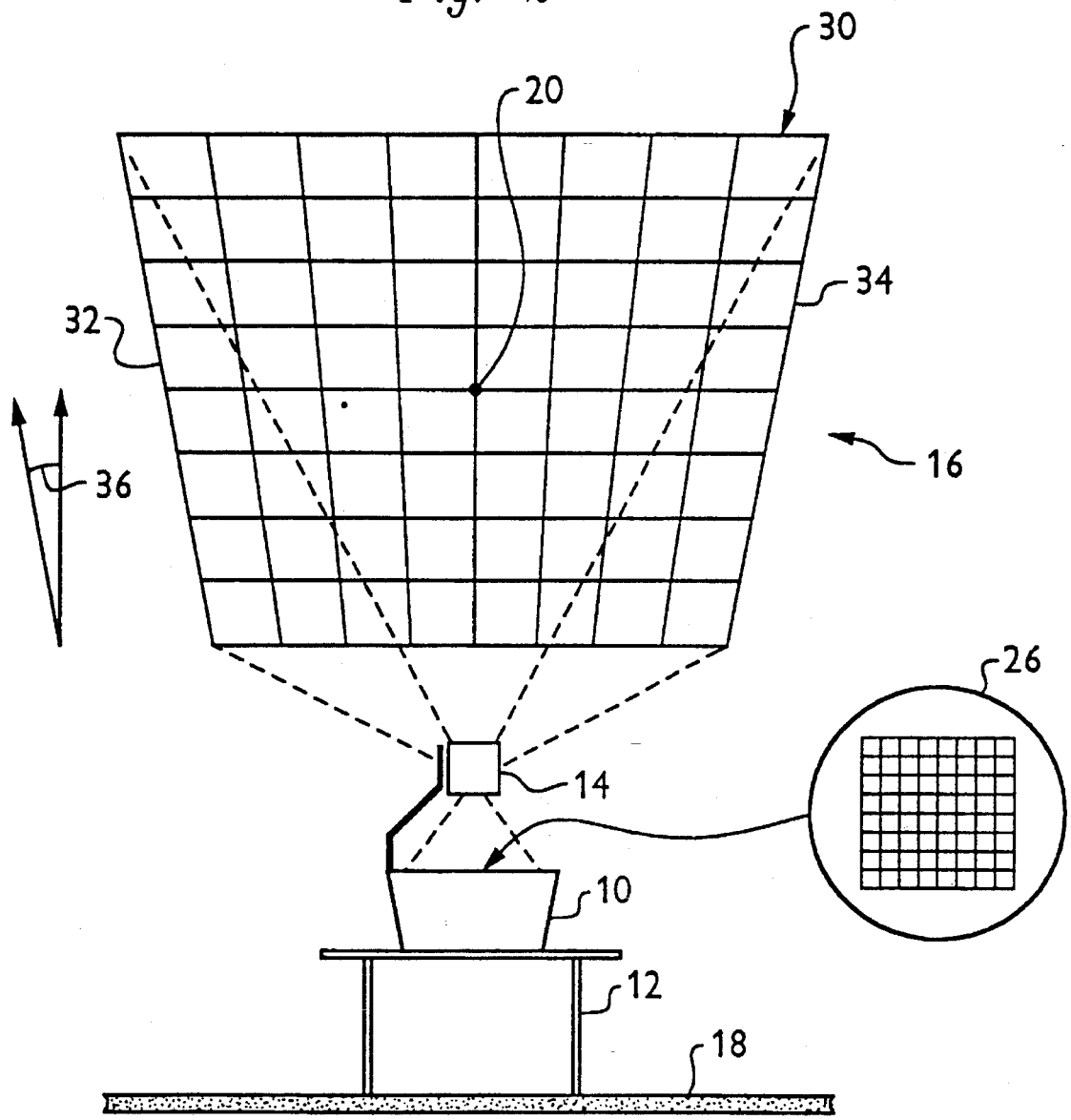
FIG. 2 is a rear view of the projection system of FIG. 1 and a distorted image produced by off-axis image projection.

Referring now to FIG. 2, there is depicted a rear view of projection system 10, which is projecting a source image 26 onto wall 16. As may be seen, off-axis projection produces a distorted image 30, which is wider at the top of the image than at the bottom of the image. In this example, distorted image 30 is produced by projecting source image 26, which is a test pattern comprising a grid of lines that are horizontal and vertical. If projection system 10 is located, as shown here, so that distorted image 30 is projected perpendicularly in a horizontal plane to wall 16, the left edge 32 and the right edge 34 of distorted image 30 will be skewed from vertical by the same angle, an angle which is illustrated at reference numeral 36.

Figure 3:
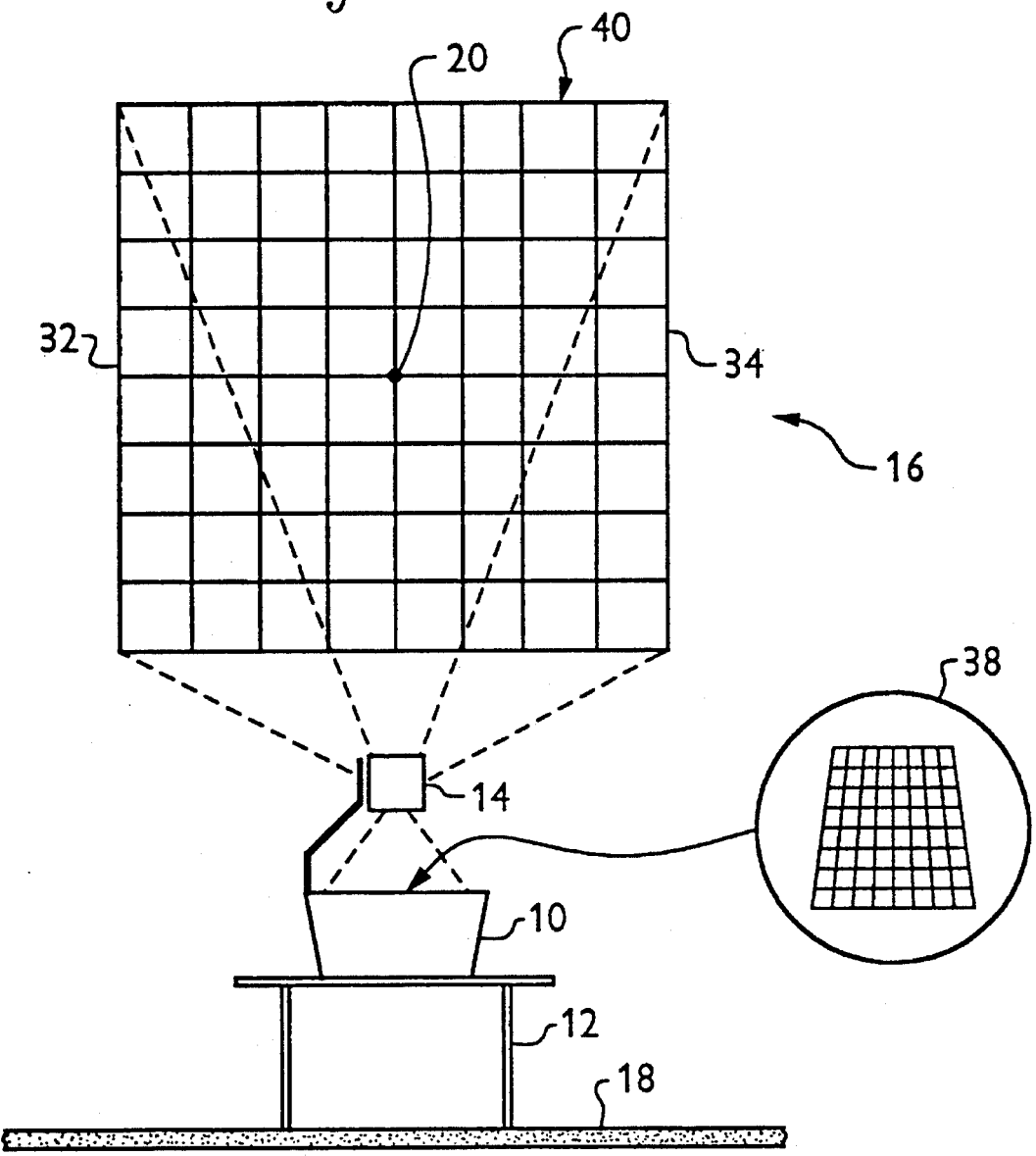
FIG. 3 depicts the off-axis projection of a precompensated image source in accordance with the method and system of the present invention.

Referring now to FIG. 3, there is depicted an off-axis projection of a precompensated image source 38, in accordance with the method and system of the present invention. As can be seen, corrected image 40 has a vertical left edge 32 and a vertical right edge 34. Corrected image 40 is produced by utilizing projection system 10 to project precompensated image source 38, which compensates for the keystone distortion resulting from off-axis projection.

Figure 4:
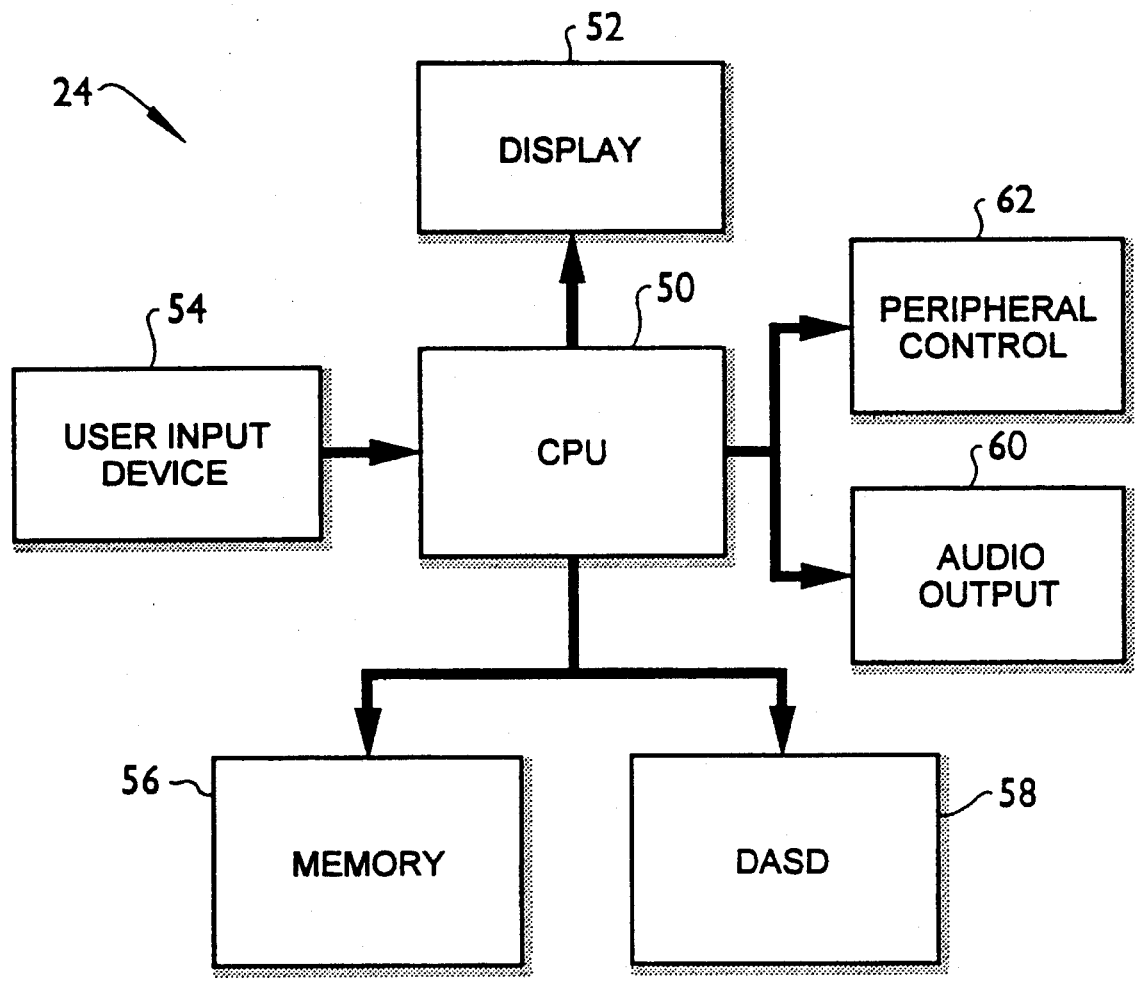
FIG. 4 is a more detailed block diagram of the data processing system of FIG. 1 in accordance with the method and system of the present invention.

With reference now to FIG. 4, there is depicted a more detailed block diagram of the data processing system of FIG. 1 in accordance with the method and system of the present invention. Data processing system 24 is controlled primarily by software executed within central processing unit (CPU) 50. CPU 50 is coupled to display 52, and receives user input from user input device 54. Display 52 may include a data processing system driven liquid crystal display (LCD) projection panel utilized in combination with an overhead projector, or a three-gun cathode-ray tube (CRT) video projection system, or an LCD projection unit, each of which may be capable of producing fully animated color images.

CPU 50 is also coupled to memory 56 and one or more direct access storage devices (DASDs), depicted at block 58. Memory 56 and DASD 58 may be utilized for storing display frames and application programs. User input device 54 may be implemented utilizing a keyboard, a mouse, a touch sensitive tablet or screen, a joy stick, a track ball, or a screen activated light pen. CPU 50 may also be coupled to audio output device 60 and peripheral controller 62. Audio output device 60, which may include an amplifier and speaker system, may be utilized to present an audio portion of a multimedia presentation. Peripheral controller 62 may be utilized to control peripheral devices, such as a video player/recorder, a slide projector or a laser disk player (none are shown), during a multimedia presentation. In the depicted embodiment of the present invention, CPU 50 is preferably suitably programmed to implement the process depicted in the flow charts of FIG. 5a and 5b and to provide a source image for the projection system 10, illustrated in FIGS. 1, 2 and 3.

Figure 5A:
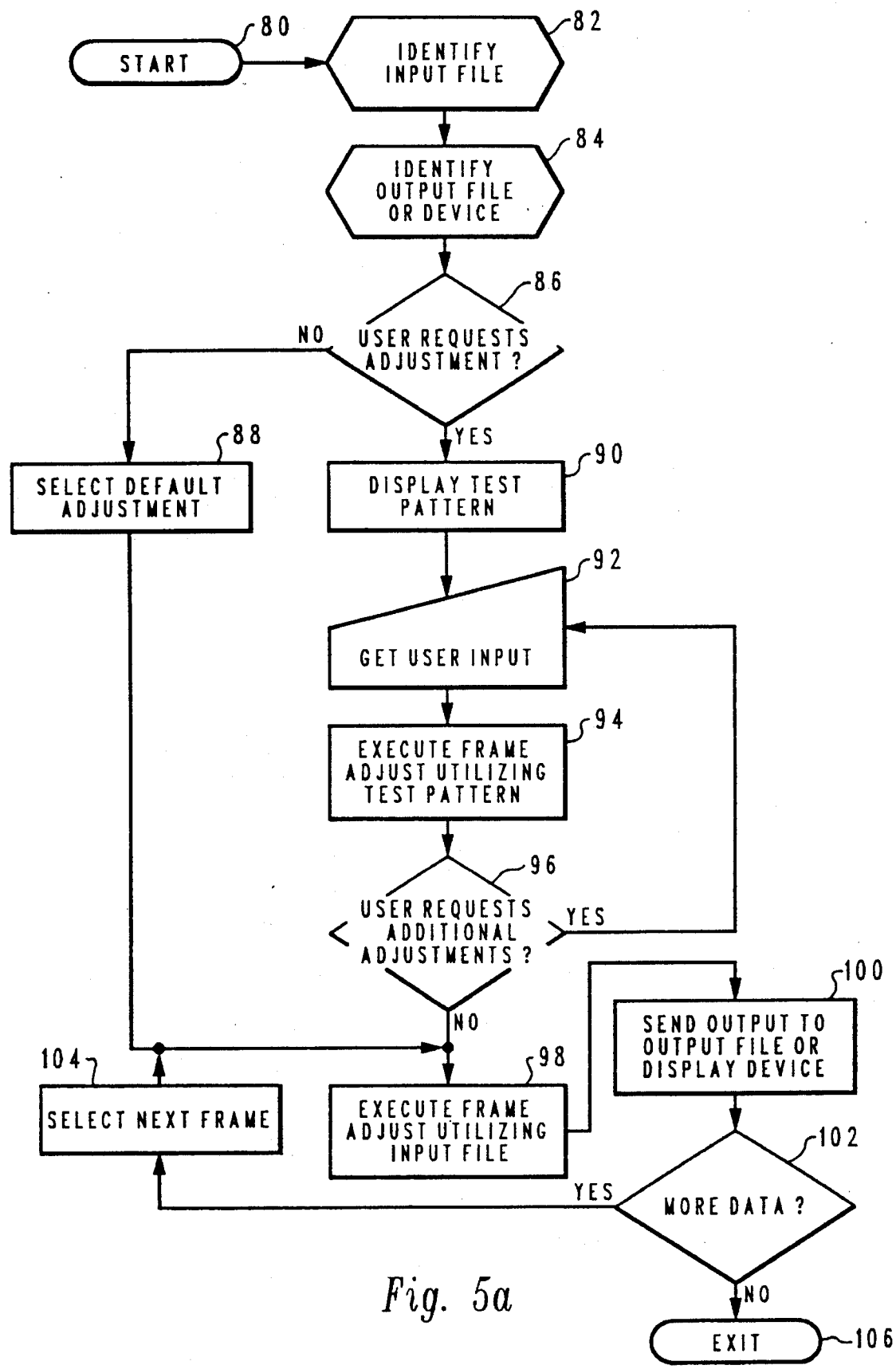
FIG. 5a is a logic flowchart which depicts a process for precompensating an image source for off-axis projection in accordance with the method and system of the present invention.

Referring now to FIG. 5a, there is depicted a logic flowchart which illustrates a process for precompensating an image source for off-axis projection in accordance with the method and system of the present invention. As depicted, the process begins at block 80 and thereafter passes to block 82. Block 82 illustrates the selection of an input file, which may be a data processing system generated text file, graphics file, or a multimedia presentation. Next, as depicted at block 84, the process identifies an output file or device. In some instances an amount of precompensation required for a particular projection system configuration may be known, and an identified input file may be precompensated by that known amount and stored in an output file for later presentation on that particular projection system configuration. Real-time image source precompensation may also be provided, in which case an output device may be specified, such as, for example, a data processing system driven liquid crystal display projection panel, or a three-gun cathode-ray tube (CRT) video projection system, or an LCD projection unit, or the like, and a user may specify an amount of precompensation may be performed while the source image is being output to the specified real-time output device.

Thereafter, the process passes to decision block 86, which illustrates a determination of whether or not a user has requested an adjustment of the image source. If the user has not requested such adjustment, the process selects a default adjustment for the image source, as depicted at block 88.

A default adjustment may be either a system default (i.e., a default specified in the software) or a user specified default—either of which may be utilized in lieu of a user's input in response to a prompt for user adjustments. Many times, a user will know the environmental details that will be involved in making a presentation and may want to specify an amount of precompensation in advance of the presentation.

For example, a user may know that in the conference room to be utilized to make a presentation, a particular type of projection system will be provided, and that the angle, relative to the projection surface, from which the source image will be projected onto the projection surface is 25°. Such environmental details surrounding the presentation may be quantified or specified and assembled to comprise a set of presentation parameters. A set of presentation parameters may include, for example, the type of projection system utilized and the relative positioning of the projection system and the projection surface. From such a set of presentation parameters, an amount of precompensation may be calculated, and utilized to determine a distortion compensation factor. Such a distortion compensation factor may then be stored (i.e., encoded) in an image source data file and utilized during a later presentation, which takes place in the conference room having the particular set of presentation parameters.

Referring again to decision block 86, those persons skilled in the art should appreciate that a user may request an adjustment of an image source utilizing several methods, such as for example, by utilizing keyboard input, a track ball, a joy stick, or a mouse.

If a user has requested adjustment of the image source, the process may display a test pattern to assist the user in determining how much precompensation is required to compensate the image source for the keystone distortion, as illustrated at block 90. The display of such a test pattern may utilize data processing system 24 to generate a grid of lines that should appear vertically and horizontally once the image source has been precompensated by an appropriate amount. However, before the image source has been precompensated, upon projection, it may appear distorted, as illustrated in FIG. 2.

Next, as depicted at block 92, the process permits a user to input parameters that specify the amount of precompensation to be applied to the displayed test pattern. Those persons skilled in the art should recognize that there are many methods of permitting a user to input such parameters. One way to input such parameters is to permit a user to utilize a keyboard to enter a number representing the number of degrees of precompensation to be applied to the image source. Another way for a user to input adjustment parameters may be to permit the user to press the arrow keys on a keyboard, which may then be interpreted as a request to make the top portion of a displayed image wider or narrower. The process may interpret the typing of an arrow key as a user request to precompensate the image source by a preselected number of degrees. A different preselected number of degrees could be utilized if a user presses a modifier key before selecting an arrow key. For example, if a user presses a right arrow key, the process may interpret that key stroke as a request to skew the right and left sides of the image toward the middle by one degree increments. Similarly, if the user presses a modification key in conjunction with the right arrow key, the process may similarly interpret that key stroke combination as a request to skew the image source by an angle of five degrees.

After the user has specified a desired adjustment, the process executes a frame adjustment utilizing the test pattern, as illustrated at block 94. The details of the process of adjusting a single frame will be discussed below with reference to FIG. 5b. As a result of the adjustment the left and right sides of the projected image will be rotated toward the center of the image, or away from the center of the image, about a point located at the lower left corner of the image and the lower right corner of the image, respectively, depending upon the direction of the adjustment specified by the user.

Next, as depicted at decision block 96, the process determines whether or not the user has requested additional adjustments of the displayed test pattern. If the user has requested additional test pattern adjustments, the process proceeds to block 92 to receive additional user inputs. Once the user has requested a final adjustment, the projected test pattern may appear as depicted in FIG. 3.

If the user has not requested additional image source adjustments, process passes to block 98. Block 98 illustrates the execution of an adjustment of a frame of image data in the previously identified input file. Details of the process of adjusting a single frame will be discussed below in reference to FIG. 5b. Thereafter, as depicted at block 100, the process outputs the adjusted frame of image data to an output file or a display device as previously identified at block 84.

Next, as illustrated at decision block 102, the process determines whether or not the input file contains additional frames of image data. If the input file contains additional frames, the process passes to block 104. Block 104 depicts the process of recalling the next frame of data in the input file. Thereafter, the process passes to block 98, which illustrates the process of executing a frame adjustment utilizing the new frame of image data. Referring again to block 102, if there are no additional frames which require adjusting, the process terminates, as illustrated at block 106.

Figure 5B:
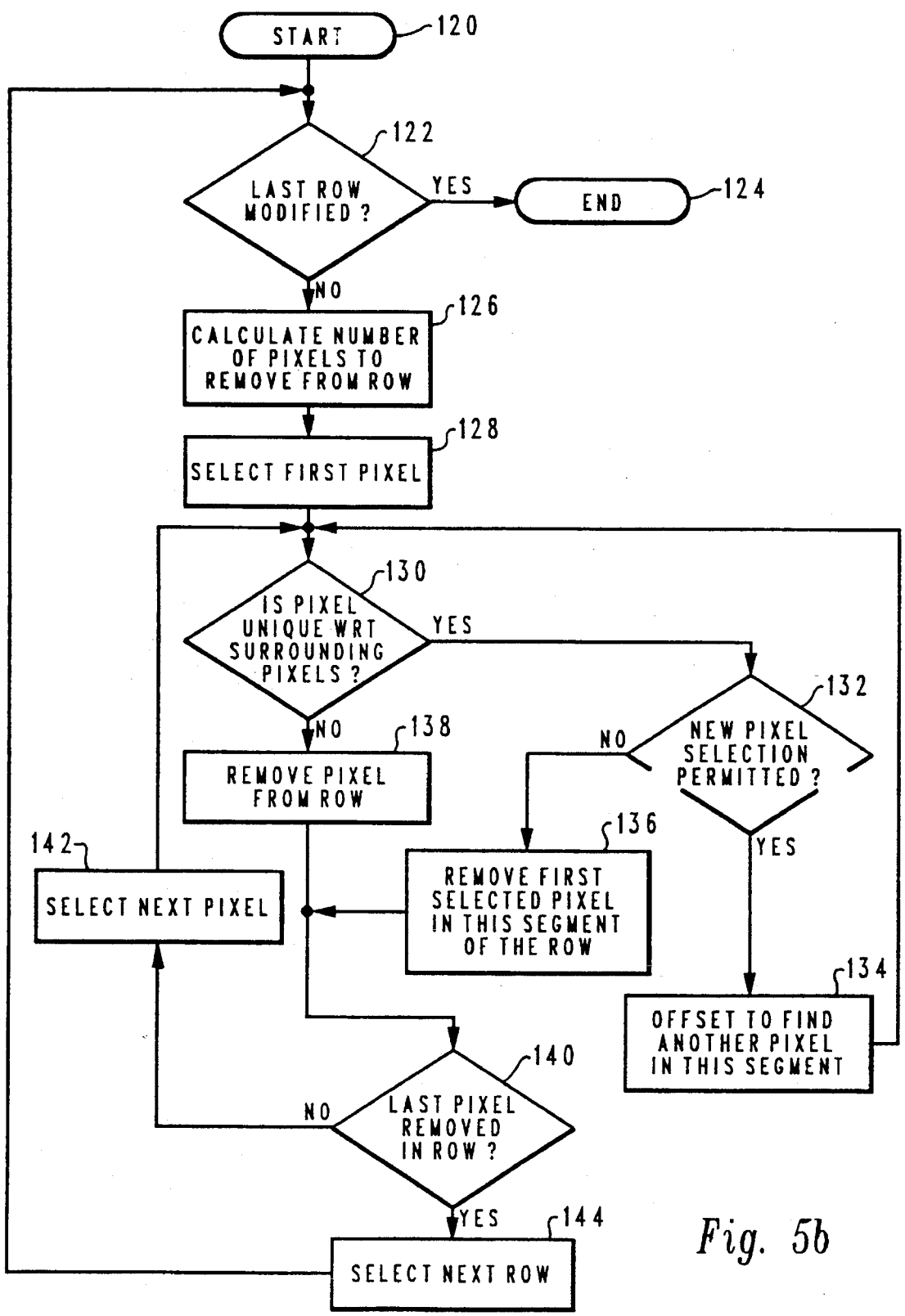
FIG. 5b is a continuation of the logic flowchart of FIG. 5a which depicts additional details of the process of adjusting a single frame of an image source.

Finally, with reference to FIG. 5b, there is depicted a logic flowchart which illustrates the process of adjusting a single frame of an image source in accordance with the method and system of the present invention. The process of adjusting a single frame of an image source begins at block 120 and thereafter passes to block 122. Block 122 illustrates the determination of whether or not the last row of pixels in a frame of data has been modified. A typical frame of data may be the digital information necessary to drive a VGA display of 640 pixels wide by 480 pixels high. Therefore, in the typical VGA display, there will be 480 rows of pixels which may require modification. Those persons skilled in the art should recognize that the present invention may be utilized to precompensate image sources having various resolutions, numbers of pixels, and aspect ratios. If the last row has been modified, the process terminates, as depicted at block 124. If the last row has not been modified, the process passes to block 126.

Block 126 illustrates the calculation of the number of pixels to be removed from a selected row in the current frame of data. In a preferred embodiment of the present invention, an equal number of pixels should be removed from each half row extending outward from both sides of a center line extending from the middle of the top row to the middle of the bottom row. The number of pixels to be removed from a particular half row may be calculated utilizing the following formula:

$$RP(y) = \left[ \frac{(\text{top inches} - \text{bottom inches})}{\text{height inches}} \right] \times (\text{\# pixels high} - y)$$

where:

$RP(y)$=number of pixels to be removed from row "y"

y=the current row number (typically from 1 to 480)

top inches=half the distance across the top of the projected image bottom inches=half the distance across the bottom of the projected image height inches=distance from the bottom to the top of the projected image pixels high=number of pixels from the bottom to the top of image source (i.e., number of rows)

For example, assume a projection of a VGA display (640 pixels wide by 480 pixels high) which has a measurement of 48 inches at the top of the projected image and 35 inches at the bottom of the projected image. Assume also that the projected image is 35 inches high. Those persons skilled in the art will recognize that as the angle of off-axis projection increases, the height of the projected image also increases. However, to simplify the calculations in this example, assume that the image is as high as it is wide at the bottom of the projected image. Therefore, the top of the projected image is 6.5 inches wider, on both sides, than the bottom of the projected image. Each side of the projected image is skewed outwardly from vertical by approximately 10.5°, which is calculated by taking the inverse tangent of (6.5"/35"). Utilizing the formula above, the number of pixels to be removed from a half row at the top of the image is 59.

After the number of pixels to be removed from the present half row is calculated, the process selects a first pixel which may be removed from the half row, as depicted at block 128. In the preferred embodiment, the pixels to be removed in a half row should be somewhat evenly spaced along the half row. One skilled in the art should recognize that the amount of distortion increases nearer the right and left edges of the projected image, and that some processes of removing selected pixels from a row may nonlinearly remove more pixels near the edges than near the center of the image source, which would more correctly compensate the source image for keystone distortion.

One method of selecting the first pixel is to divide the number of pixels in a half row by the number of pixels to be removed from the half row, which produces a number N. The half row may then be divided into N segments of pixels, and one pixel may be removed from each segment. A randomly produced base adjustment, ranging from N to ½ N, is then subtracted from N in order to locate the first pixel which may be removed from the half row. The base adjustment is randomly produced for each row to reduce artifact.

After the first pixel is selected, the process passes to block 130, which illustrates the process of determining whether or not the selected pixel is unique with respect to the pixels that surround the selected pixel. Each pixel in a display frame is assigned a color, which may be black or white for a monochrome image, or a level of gray for a gray-scale image, or a color, which is composed of various brightnesses of red, blue, and green. To determine whether or not a pixel is unique with respect to the surrounding pixels, the process compares the color value of the selected pixel to the pixels immediately to the right and the left of the selected pixel. If the color values of the surrounding pixels are different, the pixel is unique with respect to the surrounding pixels, and the process passes to block 132.

Block 132 depicts the determination of whether or not a new pixel selection is permitted. The selection of new pixels may be limited by the number of pixels in a segment, or by constraints on the amount of time the process may utilize searching for a pixel to remove in a particular segment. If a new pixel selection is permitted, the process passes to block 134, which illustrates the process of adding or subtracting an offset to find another pixel which may be removed from the present half row. Another pixel may be selected for removal from the present segment of the half row by alternately adding and subtracting an offset, which may be a sequentially smaller fractional value of N. If a new pixel selection is not permitted, the process will remove the first pixel selected in this segment of the half row, as depicted at block 136. Referring again to block 130, if the first pixel selected in the present segment is not unique with respect to the adjacent pixels on the left and right, the process removes that pixel from the half row, as illustrated at block 138.

Next, the process determines whether or not the last pixel has been removed in the present row, which includes consideration of whether or not the last pixel has been removed from both half rows, as depicted at block 140. If not, the process passes to block 142, which illustrates the selection of a next pixel, which may be removed from the row. Thereafter, the process iteratively passes to block 130. Referring again to block 140, if the last pixel in the row has been removed, the process passes to block 144. Block 144 depicts the process of selecting the next row, and thereafter the process iteratively passes to block 122, in order to remove the appropriate number of pixels form each row in a display frame.

Although the method of precompensating an image source utilized in the preferred embodiment employs a method and system of removing selected pixels from selected rows, it should be understood that additional methods of precompensating image sources may be utilized without departing from the material features of the present invention. For example, a page description language, such as PostScript (PostScript is a registered trademark of Adobe Systems, Inc.), may be utilized to precompensate image sources output to a printing device such as a laser printer or film recorder, or displayed utilizing a data processing system to drive a liquid crystal display (LCD) projection panel in conjunction with an overhead projector, or a three-gun cathode-ray tube (CRT) video projection system, or an LCD projection unit.

While the invention has been particularly shown and described with reference to a preferred embodiment, it will be understood by those skilled in the art that various changes in form and detail may be made therein without departing from the spirit and scope of the invention. For example, those persons skilled in the art should realize that a source image may be precompensated for keystone distortion resulting from off-axis projection in a horizontal plane, as well as for the keystone distortion resulting from off-axis projection in the vertical plane, as disclosed herein.

What is claimed is:

1. A method in a data processing system for modifying an image source data file to compensate for distortions resulting from a projection of a source image onto a surface that is not perpendicular to a source image projection system, said method comprising the steps of:

identifying a data processing system image source data file;

displaying a test pattern utilizing a data processing system visual output device;

modifying said test pattern utilizing a distortion compensation factor; and modifying said data processing system image source data file utilizing said distortion compensation factor, wherein a subsequent projection of said source image is compensated for distortion.

2. The method in a data processing system for modifying an image source data file according to claim 1, further including the step of prompting a user to enter said distortion compensation factor.

3. The method in a data processing system for modifying an image source data file according to claim 1, further including the step of permitting a user to determine a final distortion compensation factor in response to the appearance of said modified test pattern.

4. The method in a data processing system for modifying an image source data file according to claim 1, further including the step of outputting said modified data processing system image source data file.

5. The method in a data processing system for modifying an image source data file according to claim 4, wherein the step of outputting said modified data processing system image source data file further comprises the step of printing said modified data processing system image source data file.

6. The method in a data processing system for modifying an image source data file according to claim 4, wherein the step of outputting said modified data processing system image source data file further comprises the step of displaying said modified data processing system image source data file.

7. A system for modifying an image source data file to compensate for distortions resulting from a projection of a source image onto a surface that is not perpendicular to a source image projection system, said system comprising:

means for identifying a data processing system image source data file;

means for displaying a test pattern utilizing a data processing system visual output device;

means for modifying said test pattern utilizing a distortion compensation factor; and means for modifying said data processing system image source data file utilizing said distortion compensation factor, wherein a subsequent projection of said source image is compensated for distortion.

8. The system for modifying an image source data file according to claim 7, further including means for prompting a user to enter said distortion compensation factor.

9. The system for modifying an image source data file according to claim 7, further including means for permitting a user to determine a final distortion compensation factor in response to the appearance of said modified test pattern.

10. The system for modifying an image source data file according to claim 7, further including means for outputting said modified data processing system image source data file.

11. The system for modifying an image source data file according to claim 10, wherein said means for outputting said modified data processing system image source data file further comprises means for printing said modified data processing system image source data file.

12. The system for modifying an image source data file according to claim 10, wherein said means for outputting said modified data processing system image source data file further comprises means for displaying said modified data processing system image source data file.

13. A method in a data processing system for modifying an image source data file to compensate for distortions resulting from a projection of a source image onto a surface that is not perpendicular to a source image projection system, said method comprising the steps of:

identifying a data processing system image source data file;

storing a distortion compensation factor, associated with a predetermined set of presentation parameters, within said data processing system image source data file; and automatically modifying said data processing system image source data file utilizing said distortion compensation factor in response to a presentation of said image source data file utilizing said set of presentation parameters, wherein a subsequent projection of said source image is compensated for distortion.

14. A method in a data processing system for modifying an image source data file according to claim 13, wherein the step of storing a distortion compensation factor associated with a predetermined set of presentation parameters within said data processing system image source data file further comprises storing multiple distortion compensation factors, each associated with a predetermined set of presentation parameters, within said data processing system image source data file.

15. A method in a data processing system for modifying an image source data file according to claim 13, wherein the step of automatically modifying said data processing system image source data file utilizing said distortion compensation factor in response to a presentation of said image source data file utilizing said set of presentation parameters further comprises the step of selecting one of said multiple distortion compensation factors in response to a presentation of said image source data file utilizing a selected one of said predetermined sets of presentation parameters.

\* \* \* \* \*